March 22, 1949.　　　C. F. LEATHERS　　　2,464,935
ELECTRICAL WELDING CONTROL SYSTEM
Filed Feb. 8, 1945
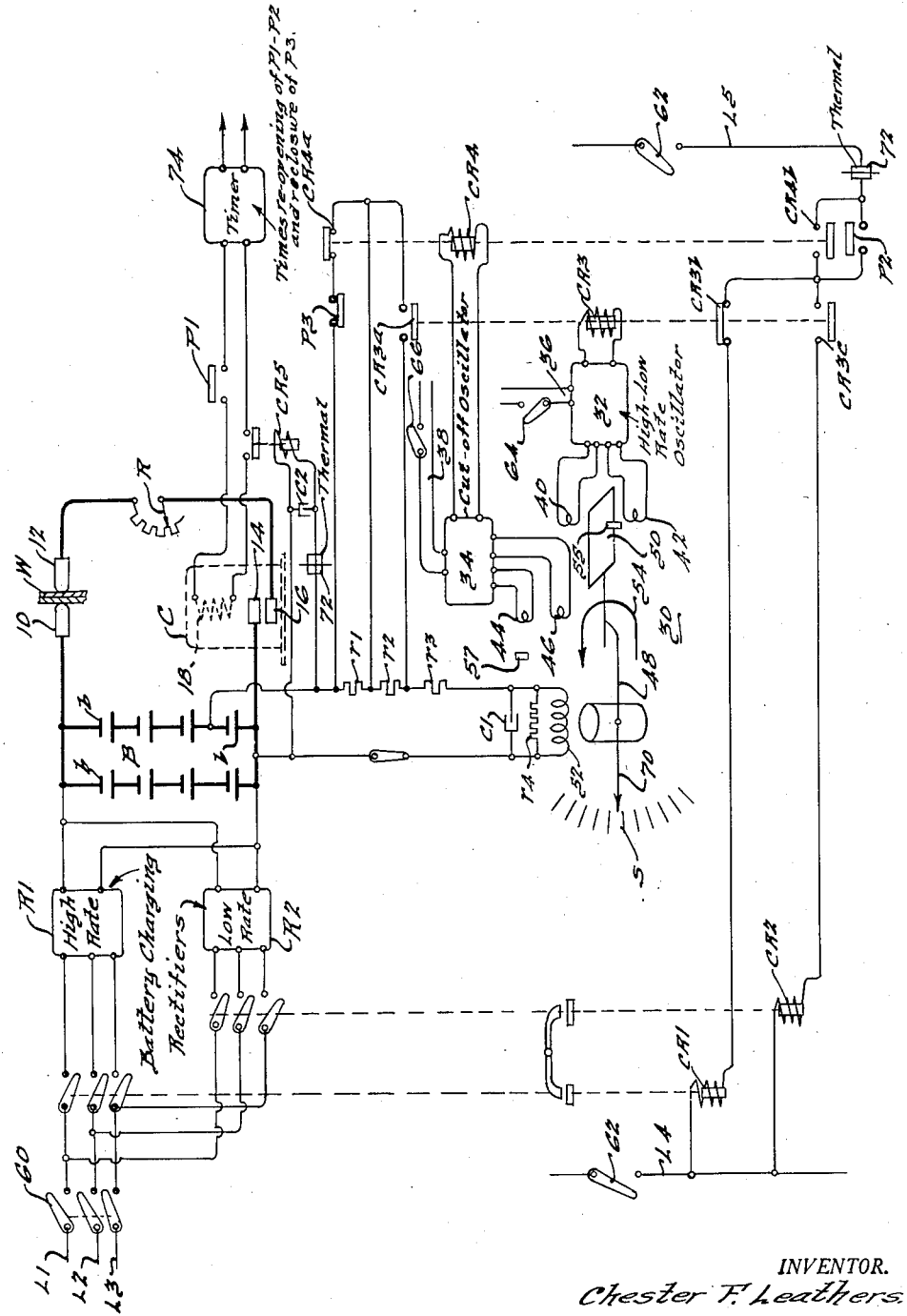
INVENTOR.
Chester F. Leathers
BY
Harness, Dickey & Pierce
ATTORNEYS.

Patented Mar. 22, 1949

2,464,935

UNITED STATES PATENT OFFICE 2,464,935

ELECTRICAL WELDING CONTROL SYSTEM

Chester F. Leathers, Detroit, Mich.

Application February 8, 1945, Serial No. 576,825

13 Claims. (Cl. 219—4)

The present invention relates to electrical control systems, and more particularly, is directed to the provision of an improved system for controlling the delivery of charging current to an electric storage battery unit which is utilized as a source of welding energy in a resistance welding or similar system.

Principal objects of the invention are to provide a system of the above generally indicated character which is simple in arrangement, economical of manufacture and assembly and which is reliable and efficient in operation; to provide such a system which includes elements disposed to provide a plurality of different charging rates, a higher such rate being somewhat in excess of the average current demand from the battery unit, and a lower such rate being slightly below such average current demand; to provide such a system in which the aforesaid elements function to continuously maintain the charging voltage of the battery unit between upper and lower limits, such limits being sufficiently close together to provide satisfactory welding conditions; and to generally improve and simplify battery charging systems, particularly those suited for resistance welding purposes.

With the above as well as other and more detailed objects in view, which appear in the following description and in the appended claims, a preferred but illustrative embodiment of the invention is shown in the accompanying drawing, in which the sole figure is a diagrammatic representation of a system embodying the invention.

It will be appreciated from a complete understanding of the present invention, that in their more generic aspects, the improvements thereof may be embodied in battery charging systems of widely differing capacities and adapted for widely differing types of service. A preferred application of the invention is in connection with battery operated resistance welders, of the type described and claimed in the copending application of Fred H. Johnson and the present applicant, Serial No. 479,998, filed March 22, 1943, now Patent No. 2,452,573, dated November 2, 1948, and in the copending application of the present applicant, Serial No. 545,322, filed July 17, 1944, now Patent No. 2,449,707, dated September 21, 1948. In an illustrative but not in a limiting sense, the invention is so disclosed herein.

Referring to the drawing, the illustrative spot welding electrodes 10 and 12 are illustrated as being connected, in series with a regulator R, and a heavy duty contactor C, across a battery unit B which is illustrated as comprising two groups of individual batteries b which are connected in parallel with each other, the individual batteries in each group being connected in series. The just-mentioned grouping of the batteries b will be recognized as illustrative only.

Contactor C may and preferably does embody the arrangements described and claimed in the aforesaid copending applications. For present purposes, it is sufficient to note that this contactor is of the carbon pile type, having a plurality, specifically two, of carbon disks 14 and 16 which are continuously biased to the illustrated separated position, but which can be moved into engagement with each other by suitable actuating means which respond to the energization of the associated winding 18. Generally, these actuating means include fluid motor mechanism, in which event winding 18 may be regarded as the control winding of the valve mechanism which supplies the fluid motor elements.

Before proceeding to a description of the battery charging elements, it may be noted that in making a weld, the work W is interposed between the electrodes 10 and 12, after which the latter are caused to engage the work at a suitable pressure (by means not shown). Thereafter, contactor C may be energized. Upon being energized, winding 18 introduces a series of operations which results in moving the carbon disks 14 and 16 together and in thereafter building up the pressure between them to a desired maximum contactor pressure. This pressure is preferably built up at a controlled rate, and brings the resistance of the contactor to a very low value. Under welding conditions, accordingly, the resistance of the above described power circuit is represented in major part by the resistance at the junction between the workpieces and by the internal resistance of the battery unit; and in minor part by the regulator R which may be adjusted to govern the voltage across (and, consequently, the current through) the welding circuit.

At the conclusion of a desired welding period, the length of which is preferably automatically controlled, switch P1 is opened, de-energizing the contactor C. This action first progressively reduces the pressure between the carbon disks 14 and 16, and thereafter allows the latter to separate. The rate of pressure reduction is preferably so related to the constants of the welding circuit as to enable the welding current to drop to a minor fraction of its maximum value before the disks 14 and 16 are separated.

As will be understood, various automatic timing arrangements, such, for example, as those described in the aforesaid copending joint application, may be utilized to control the duration of the flow of welding current in response to each closure of switch P1. Such means form no part of the present invention, and consequently need not be further described or illustrated herein.

In the preferred practice of the present invention the battery unit B is continuously connected, while in service, to a source of charging current. This arrangement is preferred for a variety of reasons. For example, such connection enables a desired portion of the energy required to make each weld to be derived directly from the line, thereby lightening the battery load without at the same time imposing an undue load on the source of charging current. Again, the continuous connection materially reduces the number of switching operations which would be involved if the battery charger were disconnected as an incident to the making of each weld.

Particularly in connection with timing control systems in which the duration of flow of welding current, in connection with successive welds, is predetermined, it is very desirable to maintain the terminal voltage of the battery unit B between relatively close limits. With such control, the amount of energy delivered to the work in connection with the making of a particular weld can be accurately predetermined, thereby producing successive welds of uniformly good quality. In a typical welder, the duty cycle, though relatively uniform when considered with respect to a period of hours, is relatively irregular with respect to shorter periods. For example, in either a single or multiple point welder, it may be desired to make a succession of, say, 30 to 40 welds at a rate of, for example, 100 spots a minute. Such succession of welds may then be followed by an idle period of a minute or more during which the completed weldment is removed from the machine and a new weldment is inserted into the machine. These circumstances as well as others complicate the problem of economically controlling the delivery of charging current to the battery unit while maintaining the charging voltage of the battery unit between the above-mentioned relatively close limits.

In accordance with the present invention these problems are efficiently solved by providing a battery charger which is arranged to deliver energy to the battery unit at a plurality of different rates. Specifically, two rates are preferred. The higher rate is preferably adjusted so that while it is very materially lower than the peak demand (represented by the actual making of a weld) it is slightly in excess of the average current demand of the welding circuit (allowing for the intervals between successive welds as well as for the intervals while weldments are being removed from and inserted into the welder). The lower rate on the other hand is preferably slightly lower than such average current demand.

As shown diagrammatically in the present drawing, the two rates are obtained by providing a pair of rectifiers R1 and R2, the output terminals of which are connected directly across the terminals of the battery unit. Rectifiers R1 and R2 are arranged to be supplied from a conventional multiphase source L1—L2—L3. Usual normally open mechanically interlocked contactors CR1 and CR2 are provided to selectively connect either the high rate rectifier R1 or the low rate rectifier R2, to the just-mentioned source. Contactors CR1 and CR2 are controlled by a pair of usual electromagnetically operated relays CR3 and CR4, which respond, as described below, to a voltage measuring unit designated as a whole as 30. More particularly, and normally, when the system is placed in service, the high rate contactor CR1 is energized, establishing the higher charging rate, and maintaining such higher charging rate until a predetermined maximum charge voltage of the batteries is attained. When such maximum charge voltage is attained, unit 30 operates to de-energize contactor CR1 and energize contactor CR2. This action establishes the lower charging rate, and maintains such rate until a lower charge voltage is attained, at which time the higher rate is again established and maintained until the maximum charge voltage is attained. To accommodate shut down operations, the measuring device 30 is also arranged to automatically disconnect the battery charging units from the batteries in the event the latter attain a voltage which exceeds the above-mentioned maximum voltage by more than a predetermined amount.

The measuring unit 30 may, in the broader aspects of the present invention, be variously arranged. Preferably and as illustrated, it is of the electronic type, one commercially available form of which is described in MacLaren Patent No. 2,234,184. The present unit 30 embodies modifications of the patented type which adapt it to the hereinafter described control operations.

More particularly, measuring unit 30 utilizes a pair of oscillator circuits 32 and 34 which may be and preferably are arranged as described in the MacLaren patent. Oscillators 32 and 34 are provided with input circuits 36 and 38 which when energized, tend to cause the oscillators to pass a sufficiently high current to energize respectively the associated control relays CR3 and CR4. Oscillators 32 and 34 are also provided with related pairs of windings 40—42 and 44—46, the windings of each pair being normally inductively coupled to each other, but the windings of the respective pairs being uncoupled. A galvanometer element 48 carries a magnetic shield 50, which, when interposed between windings 40 and 42, for example, magnetically uncouples them, thereby sufficiently reducing the oscillator current to cause relay CR3 to fall to the de-energized position. Similarly, if shield 50 is interposed between windings 44 and 46, the output of oscillator 34 is so far reduced as to cause relay CR4 to fall to the de-energized position. The galvanometer coil is diagrammatically shown at 52, and is connected to respond to the voltage of the battery unit B. More particularly, it being assumed that all batteries b are at the same voltage, coil 52 is connected across one of the batteries b, in series with a plurality of adjusting resistors r1, r2, and r3. For reasons mentioned below, it is desired to damp the movements of vane 48 so that it does not respond substantially during the relatively short interval represented by the making of a single weld. Illustrative means for damping the galvanometer 48 are illustrated as comprising a stabilizing resistor r4 and a condenser C1. It will be understood, too, that the vane 48 is continuously biased in a clockwise direction, to a position in which it is remote from both pairs of oscillator coils 40—42 and 44—46; and that coil 52, when energized, biases the vane 48 in a counterclockwise direction, as indicated by the arrow 54. A stop 55 limits such clockwise movement to a position in which shield 50 is in shielding relation to coils 40—42.

It is believed that the remaining details of the system can best be understood from a description of the operation thereof. In this description the action of the system in normally maintaining the batteries at a desired charge, assuming no energy is used in making welds, is treated first.

It will be recognized that all of the illustrated control relays and contactors are shown in the positions occupied thereby when the system as a whole is de-energized. In order to place the system in operation, the usual disconnect switches 60, 62, 64 and 66 may be closed, all of which may be mechanically interlocked, as will be understood. Closure of disconnect switch 60 prepares the connections between the rectifiers R1 and R2, and the source L1—L2—L3. Disconnect switches 62 in turn energize the supply conductors L4 and L5 associated with contactors CR1 and CR2. Disconnect switches 64 and 66 in turn energize the respective oscillators 32 and 34.

The voltage of the batteries b may be assumed to be at the normal open circuit voltage thereof, which normal open circuit voltage may be either a fully charged open circuit voltage or an open circuit voltage somewhat below the fully charged condition. In general, it is preferred that this normal open circuit voltage correspond to between 80% and 100% of a fully charged condition of the battery. For example, such normal open circuit voltage may be of the order of 2.08 volts per cell $b$. This voltage is lower than the voltage required to bring shield 50 into cooperative relation to either of the pairs of oscillator coils 40—42 or 44—46, but stop 55 retains shield 50 in shielding relation to coils 40—42. Consequently, under the condition stated, closure of disconnect switches 64 and 66 results in an immediate energization of control relay CR4, but, oscillator 32 being shielded, relay CR3 remains de-energized.

Upon being energized, relay CR4 opens its back contact CR4a and closes its front contact CR4b. The opening of contact CR4a introduces resistor $r1$ into the circuit of the galvanometer coil 52 which action reduces its energization, but is otherwise without immediate effect.

The open condition of contact CR3c prevents energization of contactor CR2, associated with the low rate battery charging rectifier R2, but the closed condition of contact CR3b enables the closure of contact CR4b to complete an obvious energizing circuit for contactor CR1, which thereupon closes its associated contacts and connects the battery unit B to the source L1—L2—L3 through the high rate rectifier R1. This action initiates a charging action at the high rate.

It will be appreciated that this action relatively quickly raises the terminal voltages of the individual batteries $b$ to a value conventionally known as the charge voltage, and which, during the flow of charging current, is made up of three components. These are the open circuit terminal voltage, the IR drop through the battery due to the flow of charging current, and a component which is sometimes considered to be due to a concentration of ions at the battery plates, resulting from the application to the batteries of the charger voltage. Assuming, for example, the aforesaid open circuit voltage of 2.08 volts, the just-mentioned charge voltage may be, for example, 2.35 per cell, of which .10 volt may be due to the IR drop through the battery due to the charging current.

The adjustment of the present system is preferably such that the just-mentioned charge voltage is sufficiently high to enable coil 52 to swing shield 50 out of cooperative relation with coils 40 and 42 which isolated them from each other. This action increases the oscillator current of oscillator 32 and energizes relay CR3, contacts CR3a and CR3c whereof consequently close and contacts CR3b whereof open. The transfer of contacts CR3b and CR3c de-energizes contactor CR1 and energizes contactor CR2, thereupon disconnecting the high rate charger R1 and connecting the low rate charger R2. Closure of contact CR3a short-circuits adjusting resistor $r2$, which action increases the energization of coil 52 and enables it to swing shield 50 to a position nearer, but still out of cooperative relation to, coils 44—46.

It will be recognized, as aforesaid, that the just-mentioned actions take place very promptly and that further, if no energy is taken from the system, the low rate charge $r2$ will continue to build up the charge voltage of the batteries to a value above the initial value. At a charge voltage corresponding, for example, to 2.36 volts per cell, coil 52 is sufficiently energized to cause shield 50 to move into shielding relation to coils 44—46. As soon as shield 50 shields coils 44—46, relay CR4 resumes the de-energized position. This action, at contact CR4b, de-energizes the remaining contactor CR2, thereby terminating the charging action. At contact CR4a, relay CR4 short-circuits resistor $r1$, thereby increasing the energization of coil 52 sufficiently to enable it to maintain coils 44—46 shielded from each other until the terminal voltage of each battery $b$ falls to the initially mentioned normal open-circuit value. The further swing of shield 50 caused by the short-circuiting of resistor $r1$ still leaves it in shielding relation to coils 44—46, stop 57 serving to limit the movement of shield 50.

At the time the charging action is interrupted, the terminal voltage of the batteries immediately drops to a value of, for example, 2.25 volts per cell, due to the disappearance of the charging or (IR) component of voltage; thereafter the charge gradually falls to the normal open circuit value, due to the gradual disappearance of the aforesaid ion concentration or other circumstance which produces the aforesaid third component of charging voltage.

When the battery voltage falls to the normal open circuit value, shield 50 moves out of shielding relation to coils 44—46, thereby re-energizing relay CR4. At contact CR4a, relay CR4 re-inserts resistor $r1$ into the circuit of coil 52, thereby reducing its excitation and initiating a relatively rapid swing of shield 50 back into engagement with stop 55. In the latter position, coils 40—42 are shielded, and relay CR3 is, consequently, de-energized. The fall to normal open circuit voltage thus re-establishes the circuits which initiate the high charging rate. So long, therefore, as the disconnect switches are closed, accordingly, the charging system is effective to maintain the battery unit at a desired charged condition, which, as aforesaid may be either a fully charged or a partially charged condition.

With respect now to the operation of the system under conditions when energy is being periodically delivered to the welding circuit, it will be appreciated that normally each welding operation is initiated at a time when either the high rate charger R1 or the low rate charger R2 is delivering charging current to the batteries. On the other hand, the first weld of a series which is made after the cut-off relay CR4 has disconnected both chargers may be initiated at a time when neither charger R1 or R2 is active. Depending upon the length of time which has intervened between the operation of the cut-off relay CR4 and the initiation of such a weld, the battery voltage may be at any value between the aforesaid normal open circuit voltage (2.08 volts per cell) and the voltage (for example, 2.25 volts per cell) to which such voltage fell when the charging component of the charging voltage was eliminated by the operation of the cut-off relay CR4.

To insure substantial uniformity of successive welds, it is preferred to arrange the system so that the energy for each weld is derived in part from the batteries and in part from the chargers and to also insure that no flow of welding current takes place unless the terminal voltage of the batteries is at or above a predetermined value. The first of these requirements is taken care of in the present system by providing additional pilot switches P2 and P3. Switch P2 is connected directly in parallel with contact CR4b, and switch P3 is connected in series with contact CR4a of the cut-off relay CR4. By any conventional means, not shown, pilot switches P2 and P3 are arranged to be operated shortly before switch P1 is closed to initiate a flow of welding current, and are caused to resume their illustrated positions shortly after switch P1 is opened to terminate a particular flow of welding current. For example, utilizing conventional welding timers, switches P2 and P3 may be caused to operate at the beginning of the so-called "squeeze" time, and may be caused to resume their illustrated positions at the end of the so-called "hold" time. The second above-mentioned requirement is met in the present system by providing the voltage responsive control relay CR5, the coil whereof is connected across the battery terminals. Coil CR5 is adjusted so that it will not close this relay unless the battery voltage is at or above a predetermined value of the order, for example, of 2.20 volts per cell. The contact of relay CR5 is interposed in the contactor circuit so that while this relay does not interfere with the operation of pilot switches P2 and P3, it does render closure of pilot switch P1 ineffective unless and until the battery voltage is at a sufficiently high value to make a satisfactory weld. The contact of relay CR5 also controls the usual timer 74, so that the "weld time interval" does not start to run until contactor C is energized.

In order to maintain relay CR5 in energized position during the flow of welding current (during which period the battery voltage drops to a value below the pick-up value of the relay) by virtue of the IR drop through the batteries caused by the flow of welding current, a condenser C2 is connected across relay CR5.

It is noted that thermal interlocks 72 are also provided in the circuits associated with relay CR5, pilot switch P2 and contact CR4b so as to render these circuits ineffective in the event the battery temperatures are at or above predetermined, safe values.

Assume, now, that a weld is initiated at a time when, following an operation of the cut-off relay CR4, the battery voltage has fallen to a value between 2.20 volts per cell and 2.08 volts per cell. Under these conditions, relay CR5 is de-energized and both chargers are disconnected. The initiation of the weld produces a closure both of pilot switches P1 and P2, and an opening of pilot switch P3, switch P2 closing slightly ahead of switch P1. Under the conditions stated, resistor $r1$ is short-circuited, and coil 52 is sufficiently energized to hold shield 50 out of cooperative relation to coils 40 and 42. Consequently, relay CR3 is energized. Closure of pilot switch P2, consequently, energizes the low rate charging contactor CR2.

The opening of pilot switch P3, which also slightly precedes closure of switch P1, re-introduces resistor $r1$ into the circuit of the galvanometer coil 52, thereby decreasing its excitation and initiating a relatively rapid swing of shield 50 back towards the stop 55. A battery voltage of the magnitude in question is too low to hold the shield out of cooperative relation to coils 40 and 42, and the shield consequently moves into engagement with the stop 55. When the shield reaches coils 40 and 42, it deenergizes relay CR3, which action disconnects the low rate charger and connects the high rate charger. The initiation of the weld in question has, accordingly, reconnected the high rate charger to the system in much the same manner that such charger would have been re-connected if the battery voltage had been allowed to fall to the normal open circuit voltage before initiating the weld.

The battery voltage existing at the time the weld was initiated, plus the component of voltage represented by the IR drop of charging current therethrough may be sufficient to operate relay CR5. If so, the closure of pilot switch P1 energizes the contactor C and initiates a flow of welding current. If not, such closure of pilot switch P1 simply prepares the contactor circuit, which circuit is completed as soon as the high rate charger has brought the charging voltage to the operating value of relay CR5.

On the other hand, the weld in question may be initiated very shortly after the cut-off relay has been disconnected and at a time consequently when the battery voltage is little if any below the illustrative value of 2.25 volts per cell which existed immediately after cut-off. Under these conditions, the charging voltage represented by the sum of the battery voltage plus the component of charging voltage due to the action of the low rate charger in response to closure of switch P2 may be equal to the illustrative 2.35 volts per cell. This value, it will be recalled, is sufficiently high to hold shield 50 out of cooperative relation to coils 40 and 42. Under these conditions, relay CR3 is energized, leaving the low rate charger R2 in service. Under these conditions also, the battery voltage is evidently high enough to operate relay CR5, so that the weld is initiated immediately upon closure of pilot switch P1.

In either of the above two operating circumstances, the initiation of the weld first re-connects one or the other of the high rate and low rate chargers, the actual flow of welding current, and the timing of the flow of welding current, being delayed until the battery voltage has attained a value suitable for welding.

At the conclusion of the above described first weld, all of pilot switches P1, P2, and P3 resume their illustrated positions. The action of pilot switch P1 de-energizes the contactor C, terminating the flow of welding current. The action of pilot switches P2 and P3 is without effect. This is for the reason that the above described return swing of the shield 50, which was produced by the opening of switch P3 at the beginning of the weld, served to re-energize relay CR4 which, at contact CR4a, interrupts the circuit of the adjusting resistor $r1$. The re-closure of contact CR4b prepares the normal circuits for the charging contactors CR1 and CR2. It will be appreciated that the making of each weld takes at least some energy from the battery. At the conclusion of such first weld, therefore, the battery voltage is at least slightly below the cut-off value. The pilot switches P2 and P3, though operated at the beginning and end of each weld, are effective to modify the action of the charging circuits only in connection with the first weld which is made after an operation of the cut-off relay CR4 and while such relay is de-energized.

It will be recalled that the high charging rate is in excess of the average current demand of the welder and that the low charging rate is lower than the average current demand of the welder. Accordingly, if it be assumed that the above described first weld led to the re-energization of the high rate charger R1, it will be evident that during the course of a succession of welds, that the charging voltage of the battery will gradually rise. At the illustrated value of 2.35 volts per cell, shield 50 passes out of cooperative relation to coils 40—42, thereby energizing relay CR3 and establishing the low charging rate.

With the low charging rate in effect, either because of the just-mentioned operation, or because such low charging rate was established by the initiation of the first weld, it will be appreciated that the battery charging voltage will gradually fall off during the making of a succession of welds. When such charging voltage reaches the previously mentioned illustrative value of 2.20 volts per cell, shield 50 again moves into cooperative relation to coils 40 and 42, re-establishing the high charging rate, which is maintained until the charging voltage of 2.35 volts per cell is attained.

In the event an interval, sufficiently long to bring the battery charging voltage to a sufficiently high value to operate the cut-off relay CR4, intervenes between two successive welds, such operation of relay CR4 again disconnects both chargers. The next succeeding weld, of course, produces the operations described above in connection with the making of the first weld of a series.

As indicated in the drawing, the vane 48 may be provided with a pointer 70, which cooperates with a scale $s$, it being understood that a primary index character may be applied to this scale at the vane position which first brings shield 50 out of cooperative relation to coils 40—42. As long as pointer 70 is displaced in a clockwise direction from this primary index character, the high charging rate is effective. So long as pointer 70 is displaced from this primary index character in a counterclockwise direction on the other hand the low charging rate is in effect. A secondary index character may be applied to the scale to indicate the entirely disconnected condition of the battery charger as a whole.

It will be appreciated from the foregoing that the present invention provides an extremely simple and effective arrangement for automatically maintaining the charged voltage of the battery unit between predetermined limits; and that only a single specific embodiment of the invention has been described, various modifications in the form, number, and arrangement of the parts may be made without departing from the spirit and scope of the invention.

What is claimed is:

1. In a system for supplying power to a load circuit, energy storage means, means for delivering charging current to the storage means, means for connecting the storage means to the load circuit, and means controlled by said connecting means for maintaining charging means connected to said storage means whenever said storage means is delivering current to said load circuit.

2. In a system for supplying pulses of power of short duration to a load circuit for heating work in the circuit by the passage of current through the work, a storage battery unit for supplying current to said load circuit, means for delivering charging current to said unit at any of a plurality of rates, means responsive to the charged condition of said unit for determining said rate and means associated with said responsive means for maintaining unchanged during said durations the one of said rates which happens to occur prior to an initiation of a said duration.

3. In a system for supplying power to a load circuit for heating work in the circuit by the passage of current through the work, energy storage means for supplying current to the load circuit in a succession of spaced impulses, which, taken with the intervals therebetween, provide an average current demand from said storage means, and means for delivering current to said storage means at either of a first or a second rate, one rate being higher than said average demand and the other rate being lower than said average demand.

4. In a system for supplying power to a load circuit for heating work in the circuit by the passage of current through the work, energy storage means for supplying current to the load circuit in a succession of spaced impulses, which, taken with the intervals therebetween, provide an average current demand from said storage means, means for delivering current to said storage means at either of a first or a second rate, one rate being higher than said average demand and the other rate being lower than said average demand, means for initiating the flow of a said impulse, and means responsive to said initiating means for controlling said charging means.

5. In a system for supplying power pulses of short duration to a load circuit, energy storage means for supplying current to the load circuit, charging means for the energy storage means, means rendering said charging means in a first effective condition in the event the charged condition of the storage means falls to a first predetermined value to provide a first charging rate until said charged condition rises to a second value and thereafter in a second effective condition to provide a lower rate until said first value is attained, and means associated with said last-named means for maintaining said last-named means in the one of its effective conditions in which it happens to be at the initiation of a duration for maintaining said charging means condition unchanged during the duration.

6. The system of claim 5 wherein said charging means is effective in the event said charged condition attains a predetermined value above said second value to interrupt said charging.

7. The system of claim 5 wherein said charging means is effective in the event said charged condition attains a predetermined value above said second value to interrupt said charging, and including means to initiate a flow of current from the storage means to the load circuit, said initiating means being interconnected with said rendering means to insure operation of said charging means prior to initiation of a flow of current from the storage means.

8. In a system for supplying power of short duration to a load circuit, energy storage means for supplying current to the load circuit, charging means for the energy storage means, means rendering said charging means effective in the event the charged condition of the storage means falls to a first predetermined value to provide a first charging rate until said charged condition rises to a second value and thereafter effective to provide a lower rate until said first value is attained, said rendering means being effective in the event said charged condition attains a predetermined value above said second value to interrupt said charging means operable to initiate a flow of current from the storage means to the load circuit and effective to cause said charging means to deliver current to the storage means, and means associated with said rendering means for maintaining said rendering means ineffective to respond to the charged condition of said storage means during the short durations.

9. In a system for supplying power to a load circuit, energy storage means for supplying current to the load circuit, charging means continually effective so long as the charged condition of the storage means is below a predetermined value to deliver charging current to the storage means at one of a plurality of rates determined by said charged condition, means operable to render said charging means ineffective to deliver charging current to the storage means when the condition of the storage means is above a predetermined value, and means for initiating a flow of current to the load circuit and for rendering said charging means effective independently of the charged condition of the storage means.

10. In an electrical system of the type in which a storage unit supplies periodic pulses of power of great magnitude and short duration to a load circuit and is charged at a plurality of rates from a supply circuit connected thereto, one of such rates being less than that necessary to maintain the storage unit fully charged and another of such rates being greater than that necessary to maintain the storage unit fully charged, the combination of control means responsive to a first predetermined minimum charged condition of the storage unit to cause said other charging rate to be applied thereto, said control means being responsive to a second predetermined minimum charged condition representative of a more fully charged condition than said first condition to cause said one rate to be applied to said unit, said control means being operable to discontinue the charging of said unit at a predetermined maximum charged condition of said unit, and means operable to connect said unit to the load circuit and to cause said storage unit to be charged at one of said charging rates irrespective of the condition of said control means.

11. In an electrical system of the type in which a storage unit supplies periodic pulses of power of great magnitude and short duration to a load circuit and is charged at a plurality of rates from a supply circuit connected thereto, one of such rates being less than that necessary to maintain the storage unit fully charged and another of such rates being greater than that necessary to maintain the storage unit fully charged, the combination of control means responsive to a first predetermined minimum charged condition of the storage unit to cause said other charging rate to be applied thereto, said control means being responsive to a second predetermined minimum charged condition representative of a more fully charged condition than said first condition to cause said one rate to be applied to said unit, said control means being operable to discontinue the charging of said unit at a predetermined maximum charged condition of said unit, means operable to connect said unit to the load circuit and to cause said storage unit to be charged at one of said plurality of rates irrespective of the condition of said control means, and means operable to render said control means ineffective to respond to changes in the charged condition of said unit during said durations.

12. In an electrical system of the type in which a storage unit supplies periodic pulses of power of great magnitude and short duration to a load circuit and is charged at a plurality of rates from a supply circuit connected thereto, one of such rates being less than that necessary to maintain the storage unit fully charged and another of such rates being greater than that necessary to maintain the storage unit fully charged, the combination of control means responsive to a first predetermined minimum terminal voltage of the storage unit to cause said other charging rate to be applied thereto, said control means being responsive to a second predetermined minimum terminal voltage greater than said first voltage to cause said one rate to be applied to said unit, said control means being operable to discontinue the charging of said unit at a predetermined maximum terminal voltage of said unit, means operable upon the application of said other charging rate to said unit for raising said second predetermined minimum terminal voltage at which said control means causes said one rate to be applied to said unit so that the increased terminal voltage of said unit due to the charging rate being applied to said unit is ineffective to cause said control means to initiate said one rate of charge prior to said unit actually reaching said one voltage, and means operable to connect said unit to the load circuit and to cause said storage unit to be charged at one of said plurality of rates irrespective of the condition of said control means.

13. In an electrical system of the type in which a storage unit supplies periodic pulses of power of great magnitude and short duration to a load circuit and is charged at a plurality of rates from a supply circuit connected thereto, one of such rates being less than that necessary to maintain the storage unit fully charged and another of such rates being greater than that necessary to maintain the storage unit fully charged, the combination of control means responsive to a first predetermined minimum terminal voltage of the storage unit to cause said other charging rate to be applied thereto, said control means being responsive to a second predetermined minimum terminal voltage greater than said first voltage to cause said one rate to be applied to said unit, said control means being operable to discontinue the charging of said unit at a predetermined maximum terminal voltage of said unit, means operable upon the application of said other charging rate to said unit for raising said second predetermined minimum terminal voltage at which said control means causes said one rate to be applied to said unit so that the increased terminal voltage of said unit due to the charging rate being applied to said unit is ineffective to cause said control means to initiate said one rate of charge prior to said unit actually reaching said one voltage, means operable upon the application of said one charging rate to said unit for raising said maximum terminal voltage at which said charging of said unit is discontinued, and means operable to connect said unit to the load circuit and to cause said storage unit to be charged at one of said plurality of rates irrespective of the condition of said control means.

CHESTER F. LEATHERS.

REFERENCES CITED

The following references are of record in the file of this patent:

UNITED STATES PATENTS

| Number | Name | Date |
| --- | --- | --- |
| 994,145 | Frees et al. | June 6, 1911 |
| 1,168,346 | Thomson | Jan. 18, 1916 |
| 1,183,264 | Woodrow | May 16, 1916 |
| 1,393,503 | Clausen | Oct. 11, 1921 |
| 1,791,156 | Beetem | Feb. 3, 1931 |
| 1,852,799 | Cheeseman | Apr. 5, 1932 |
| 2,038,195 | Pilkington | Apr. 21, 1936 |
| 2,114,827 | Aggers | Apr. 19, 1938 |
| 2,165,174 | Bridges et al. | July 4, 1939 |
| 2,166,788 | Amsden | July 18, 1939 |
| 2,200,376 | Shaver | May 14, 1940 |
| 2,295,293 | Rogers | Sept. 8, 1942 |
| 2,358,681 | Beetem | Sept. 19, 1944 |

FOREIGN PATENTS

| Number | Country | Date |
| --- | --- | --- |
| 476,703 | France | May 31, 1915 |

Certificate of Correction

Patent No. 2,464,935. March 22, 1949.

CHESTER F. LEATHERS

It is hereby certified that errors appear in the printed specification of the above numbered patent requiring correction as follows:

Column 6, line 22, for "low rate charge" read *low rate charger*; column 10, line 9, after "maintaining" insert *said*;

and that the said Letters Patent should be read with these corrections therein that the same may conform to the record of the case in the Patent Office.

Signed and sealed this 27th day of September, A. D. 1949.

[SEAL]

THOMAS F. MURPHY,
*Assistant Commissioner of Patents.*